(12) United States Patent
Lee et al.

(10) Patent No.: US 8,466,647 B2
(45) Date of Patent: Jun. 18, 2013

(54) SENSOR-TYPE BRUSHLESS DC MOTOR

(75) Inventors: Sang Kyu Lee, Gyunggi-do (KR); Dae Lyun Kang, Guynggi-do (KR)

(73) Assignee: Samsung-Electro-Mechanics Co., Ltd, Suwon, Gyunggi-Do (KR)

( * ) Notice: Subject to any disclaimer, the term of this patent is extended or adjusted under 35 U.S.C. 154(b) by 143 days.

(21) Appl. No.: 12/892,616

(22) Filed: Sep. 28, 2010

(65) Prior Publication Data

US 2011/0187303 A1    Aug. 4, 2011

(30) Foreign Application Priority Data

Jan. 29, 2010  (KR) .................. 10-2010-0008524

(51) Int. Cl.
*H02P 6/18* (2006.01)

(52) U.S. Cl.
CPC ..................................... *H02P 6/182* (2013.01)
USPC ............ 318/400.34; 318/400.32; 318/400.01; 318/700

(58) Field of Classification Search
CPC ....................................................... H02P 6/182
USPC .................. 318/400.34, 400.32, 400.01, 700
See application file for complete search history.

(56) References Cited

U.S. PATENT DOCUMENTS

| | | | | |
|---|---|---|---|---|
| 4,912,378 | A | * | 3/1990 | Vukosavic ............... 318/400.04 |
| 5,739,652 | A | * | 4/1998 | Sriram ..................... 318/400.04 |
| 7,117,754 | B2 | * | 10/2006 | Neely et al. .............. 73/862.333 |
| 7,355,313 | B2 | * | 4/2008 | Takamatsu et al. .... 310/216.016 |

* cited by examiner

*Primary Examiner* — Walter Benson
*Assistant Examiner* — David Luo
(74) *Attorney, Agent, or Firm* — Blakely Sokoloff Taylor & Zafman LLP (57) ABSTRACT

Disclosed herein is a sensorless-type brushless DC motor, including: a magnet provided in a rotor; and a stator formed by winding a coil on a core stacked with sheets while facing the magnet, wherein the position of the rotor is detected by detecting back electromotive force induced to the coil, the back electromotive force includes a harmonic component 5 times higher than a fundamental wave, and an amplitude ratio of the 5-times harmonic wave to the fundamental wave is set to be 1% or more. Further, the sensorless-type brushless DC motor can prevent a failure in detecting an initial position of the rotor by controlling a waveform of the back electromotive force and minimize an increase of a starting time.

5 Claims, 7 Drawing Sheets

FIG.1

Prior art

FIG.2

Prior art

FIG.3A

Prior art

FIG.3B

Prior art

FIG. 3C

Prior art

SENSOR-TYPE BRUSHLESS DC MOTOR

CROSS REFERENCE TO RELATED APPLICATION

This application claims the benefit of Korean Patent Application No. 10-2010-0008524, filed on Jan. 29, 2010, entitled "A Brushless Motor For Sensorless Type", which is hereby incorporated by reference in its entirety into this application.

BACKGROUND OF THE INVENTION

1. Technical Field

The present invention relates to a sensorless-type brushless DC motor.

2. Description of the Related Art

In general, in a brushless DC motor (BLDC), mechanical contact parts such as a brush, a commutator, etc., provided to alternately supply current are removed from a DC motor and an electronic rectifier is installed in the DC motor instead of the mechanical contact parts, and the BLDC is also referred to as a brushless motor.

In general, the brushless DC motor uses an armature formed by allowing current to flow on a coil by using a stator and uses a magnet in which an N pole and an S pole are repetitively formed as a rotor. A continuous rotating magnetic field of the brushless DC motor needs to be formed in order to continuously rotate the brushless DC motor and current that flows on a coil of each phase of the armature is commutated at an appropriate time in order to form the continuous rotating magnetic field. In this case, the position of the rotor should be accurately recognized. Herein, the commutation means changing the direction of current that flows a motor stator coil so as to rotate the rotor.

In particular, in order to smoothly actuate the brushless DC motor, the position of the rotor should precisely coincide with a conversion time of phase current. For this, a device for detecting the position of the rotor is required and in general, position detection sensors such as a hall sensor, a resolver element, and an encoder are used in order to detect the position of the rotor.

Since the manufacturing cost of the position detection sensor is expensive, the sensorless control to indirectly detect the position of the rotor by using voltage information, current information, etc., of the brushless DC motor is proposed. A driving mode to detect the position of the rotor by using an electrical circuit instead of the position detection sensor is referred to as a sensorless driving mode.

The sensorless driving mode uses various methods, but primarily uses Zero-crossing, which is a method for determining the position of the rotor by using a 120° conduction type or a 180°-or-less wide angle conduction type and using a method for detecting a time when a sign of back electromotive force generated for a non-conduction period is changed, i.e., a zero-cross point.

However, since the method using the back electromotive force cannot detect the back electromotive force while the rotor stops, it is difficult to detect an initial position of the rotor which stops.

A method for detecting the initial position of the rotor by switching a current pattern (pulse current within a short time) at a speed higher than a driving timing so as to prevent the rotor to react (rotate) by using a characteristic in which the inductance of a stator coil subtly varies depending on a stop position of the rotor is used in order to detect the initial position of the rotor which stops. In general, the current pattern switching is referred to as an inductive sensor mode.

As such, when a current pattern is applied the stator coil at the high speed, the rise characteristics of driving current are rapidly changed or delayed depending on a stop position of the rotor and the initial position of the rotor which stops is detected by using the rapid change or delay of the rise characteristics of the driving current.

Figure 1:
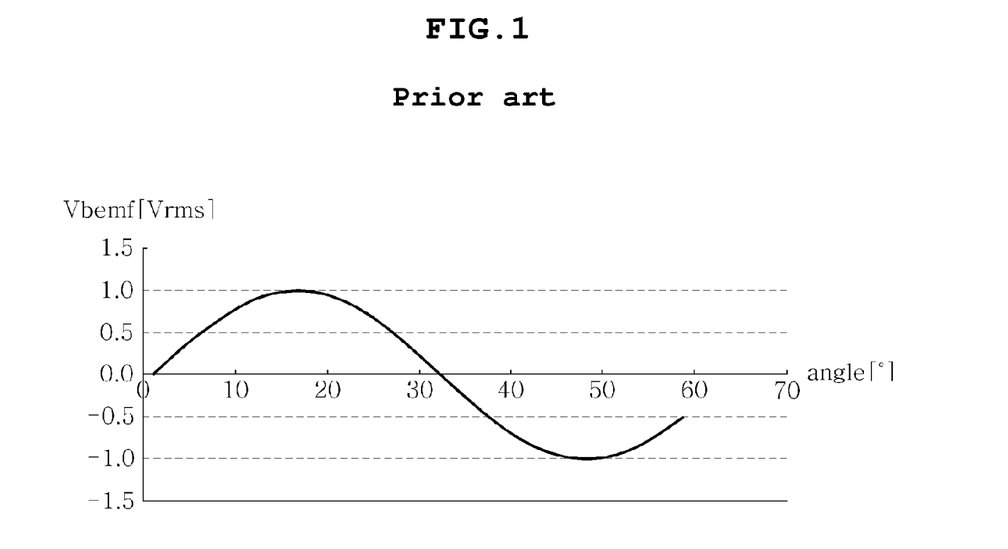
FIG. 1 is a graph showing a waveform of back electromotive force generated in a sensorless-type brushless DC motor in the prior art.
Figure 2:
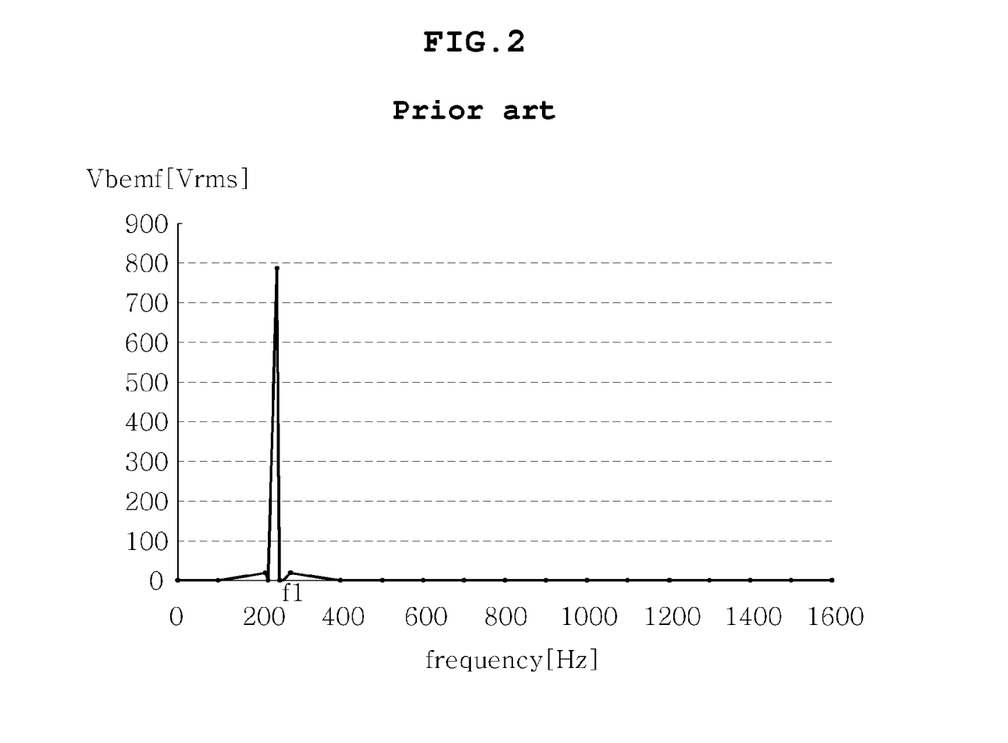
FIG. 2 is a graph showing a result of FET-analyzing a waveform of back electromotive force shown in FIG. 1.

FIG. 1 is a graph showing a waveform of back electromotive force generated in a sensorless-type brushless DC motor in the prior art and FIG. 2 is a graph showing a result of FFT-analyzing a waveform of back electromotive force shown in FIG. 1.

As shown in FIGS. 1 and 2, the waveform of the back electromotive force generated in the sensorless-type brushless DC motor in the prior art shows a sine wave form having a basic frequency f1.

However, in a production process, when magnetization of a magnet becomes weak, the number of windings of a coil decreases, or magnetization becomes non-uniform due to heat treatment of a core, etc., the intensity Vrms of the back electromotive force induced in the coil is decreased. Since the decrease in the intensity of the back electromotive force decreases a rapid rise of the driving current used to detect the initial position of the rotor, causing a starting error of the motor due to a failure in detecting the initial position of the rotor while the motor stops.

Figure 3A:
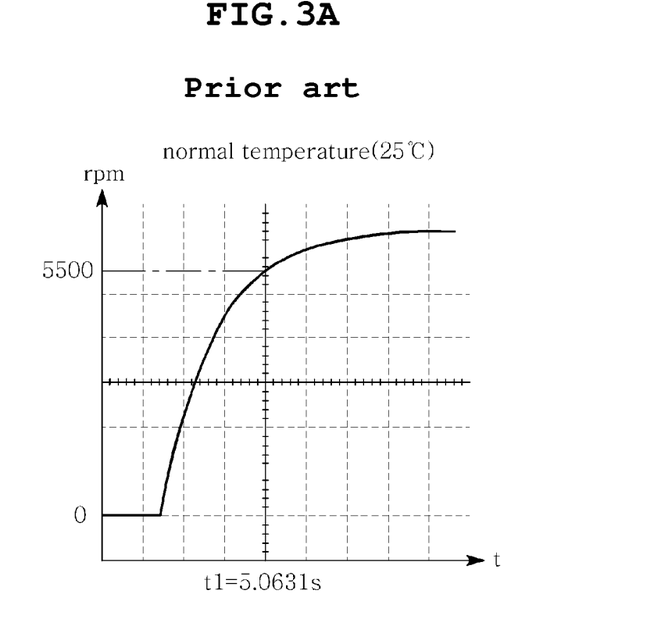
FIG. 3A to 3C are graphs showing a starting time of a sensorless-type brushless DC motor at a normal temperature, a high temperature, and a low temperature, respectively.
Figure 3B:
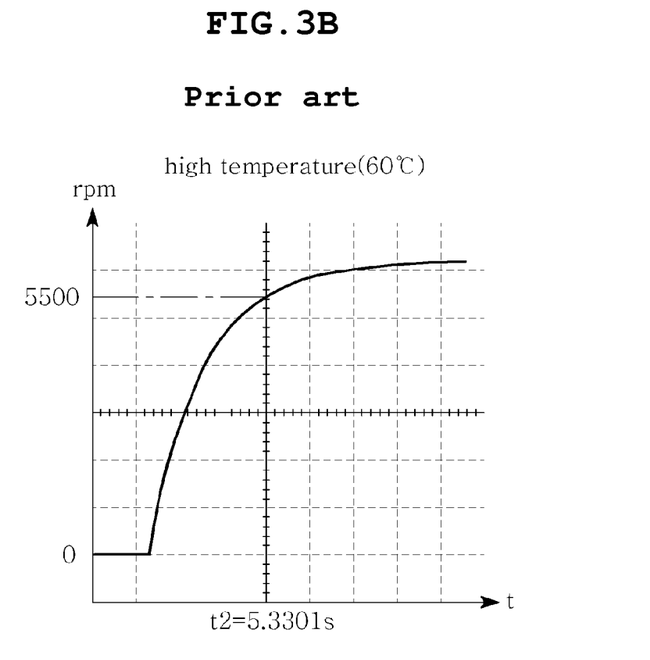
Figure 3C:
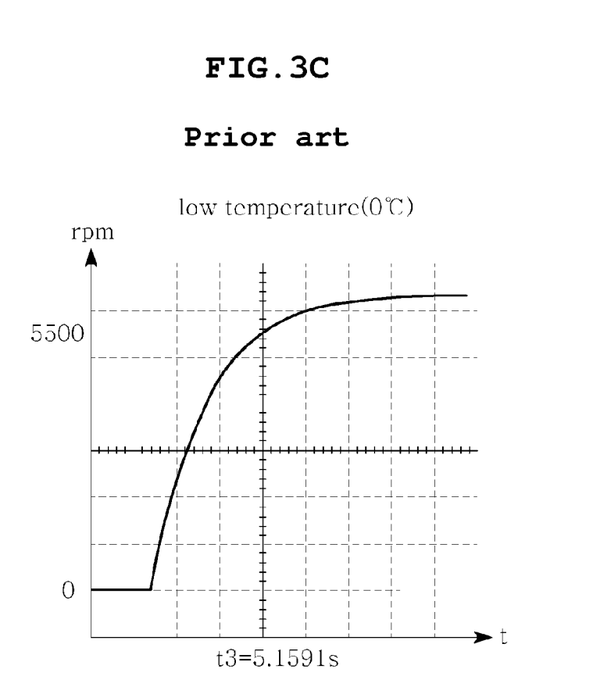

Further, the decrease of the back electromotive force increases a starting time at a high temperature (60° C.) and a low temperature (0° C.) rather than a normal temperature (25° C.). FIG. 3A to 3C are graphs showing a starting time of a sensorless-type brushless DC motor at a normal temperature, a high temperature, and a low temperature, respectively. Herein, FIGS. 3A to 3C are graphs illustrating a time for starting the motor at 0 to 550 rpm in accordance with a temperature condition, in which a starting time up to 5500 rpm at the normal temperature is t1=5.06 sec., while the starting time at the high temperature is t2=5.33 sec. and the starting time is t3=5.16 sec. at the low temperature. Like this, the starting time is increased.

That is, when the back electromotive force induced in the coil is set to a general sine wave form, detection of the initial position of the rotor may be failed and an increase of the starting time depending on a change of temperature cannot be handled.

SUMMARY OF THE INVENTION

The present invention has been made in an effort to provide a sensorless-type brushless DC motor capable of preventing a failure in detecting an initial position of a rotor by controlling a waveform of back electromotive force.

The present invention has been made in another effort to provide a sensorless-type brushless DC motor capable of minimizing an increase of a starting time of a motor depending on a change of temperature.

A sensorless-type brushless DC motor according to a preferred embodiment of the present invention includes: a magnet provided in a rotor; and a stator formed by winding a coil on a core stacked with sheets while facing the magnet, wherein the position of the rotor is detected by detecting back electromotive force induced to the coil, the back electromotive force includes a harmonic component 5 times higher than a fundamental wave, and an amplitude ratio of the 5-times harmonic wave to the fundamental wave is set to be 1% or more.

Herein, a waveform of the back electromotive force is a distorted sine wave form.

Further, the waveform of the back electromotive force has a peak value larger than a sine wave.

In addition, a ratio Lc/Lm of a longitudinal length Lc of a core to a longitudinal length Lm of the magnet is 0.85 or less.

Besides, a ratio t/La of the thickness t of each sheet of the core to an aperture La between the core and the magnet is in the range of 0.55 to 0.85.

DESCRIPTION OF THE PREFERRED EMBODIMENTS

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, in describing the present invention, a detailed description of related known functions or configurations will be omitted so as not to obscure the subject of the present invention.

Hereinafter, preferred embodiments of the present invention will be described in detail with reference to the accompanying drawings.

Figure 4:
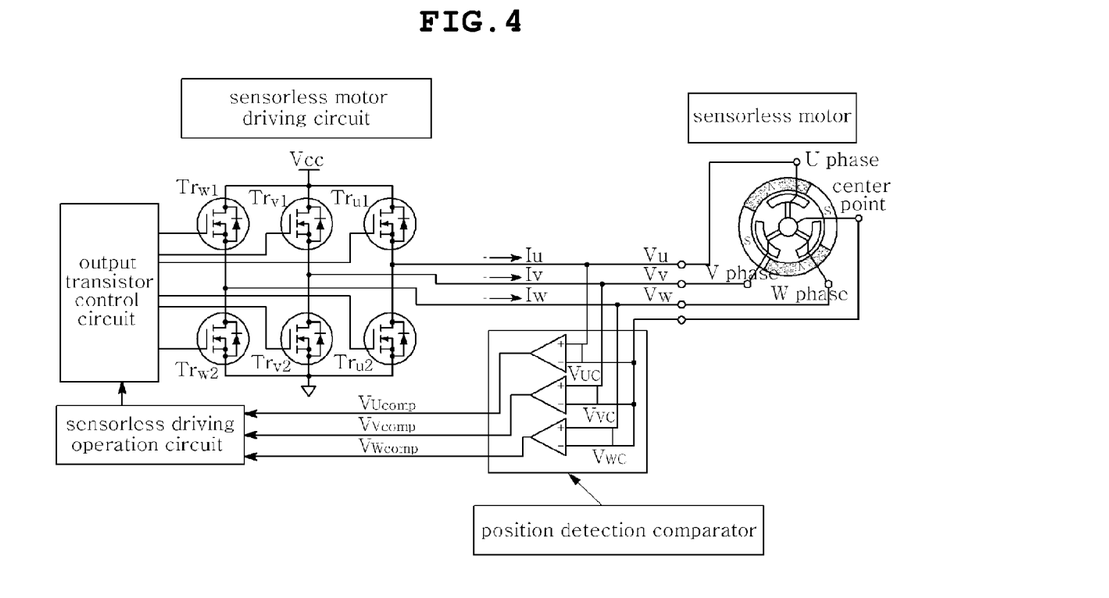
FIG. 4 is a block diagram of a driving circuit of a sensorless-type brushless DC motor according to a preferred embodiment of the present invention.
Figure 5:
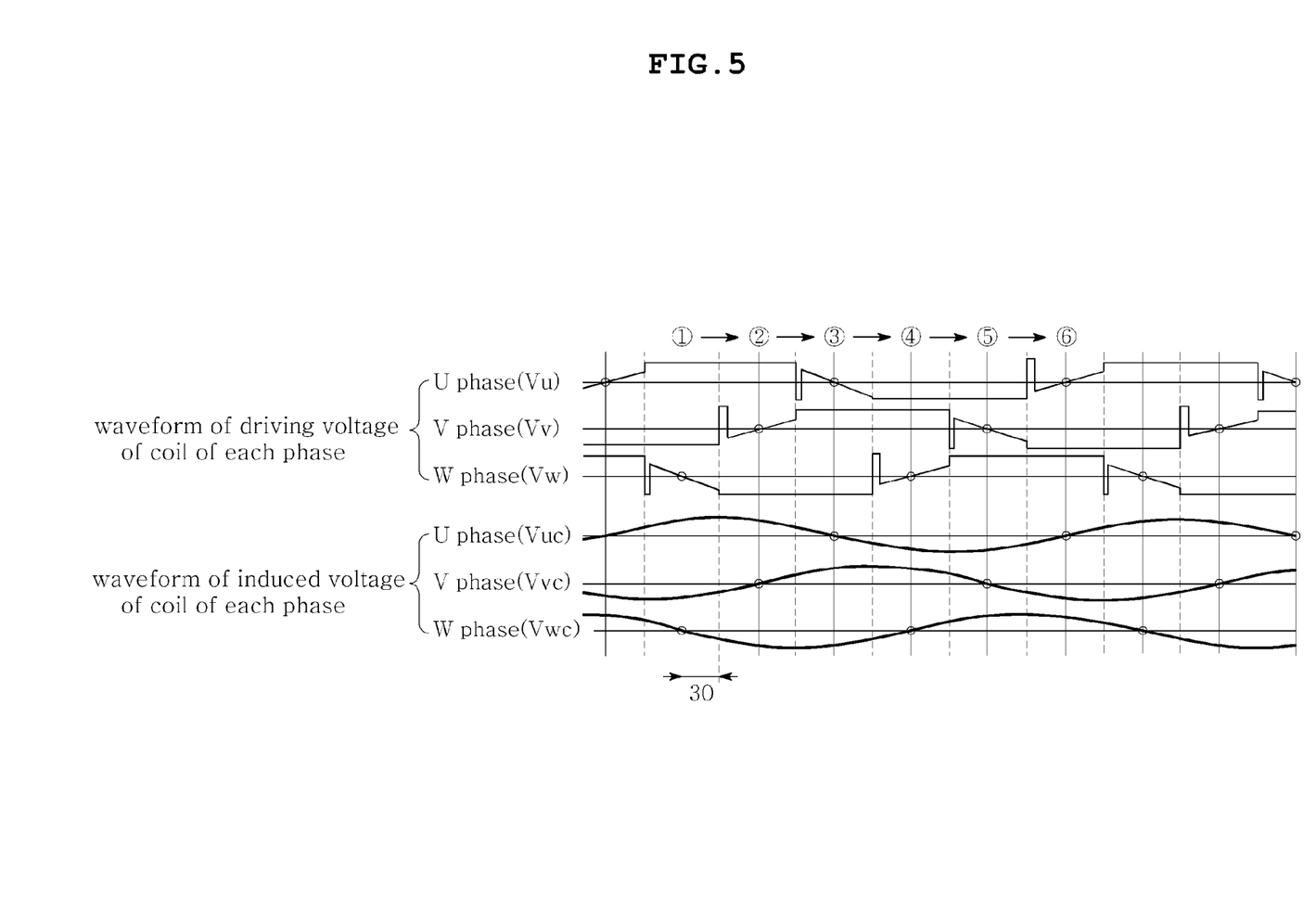
FIG. 5 is a graph showing the position of a rotor and waveforms of driving voltage and induced voltage of a coil of each phase in a sensorless-type brushless DC motor shown in FIG. 4.
Figure 6:
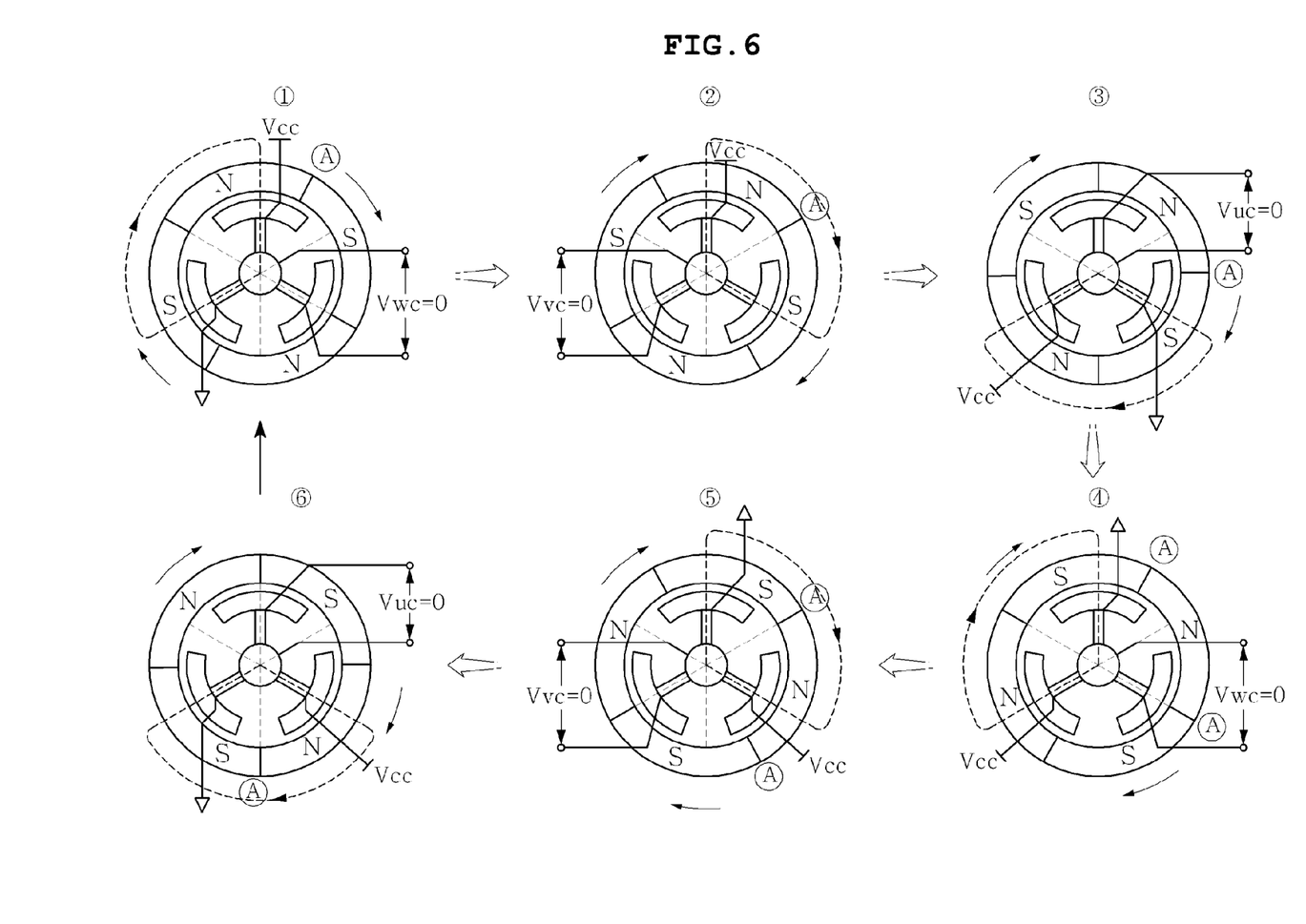
FIG. 6 is a diagram showing the position of a rotor depending on polarity switching of a stator in a sensorless-type brushless DC motor shown in FIG. 4.

FIG. 4 is a block diagram of a driving circuit of a sensorless-type brushless DC motor according to a preferred embodiment of the present invention, FIG. 5 is a graph showing the position of a rotor and waveforms of driving voltage and induced voltage of a coil of each phase in a sensorless-type brushless DC motor shown in FIG. 4, and FIG. 6 is a diagram showing the position of a rotor depending on polarity switching of a stator in a sensorless-type brushless DC motor shown in FIG. 4. Hereinafter, referring to the figures, the block diagram of the driving circuit and a detection principle of the position of the rotor in the sensorless-type brushless DC motor according to the preferred embodiment of the present invention will be described.

As shown in FIG. 4, the sensorless-type brushless DC motor includes a sensorless motor (three phases such as a U phase, a V phase, and a W phase), a position detection comparator detecting the position of the rotor by using induced voltage (Vuc, Vvc, and Vwc) generated from a stator wire of the sensorless motor, a sensorless driving operation circuit outputting a driving timing by receiving a rotor position detection signal from the position detection comparator, an output transistor control circuit outputting motor driving current by receiving a driving timing of the rotor from the sensorless driving operation circuit, and a sensorless motor driving circuit driving the sensorless motor by receiving the driving current from the output transistor control circuit.

Herein, the rotor of the sensorless motor is rotated by driving current Iu, Iv and Iw (driving voltage Vu, Vv, and Vw generated by the driving current) and specifically, its rotation position is changed depending on a pattern of the driving current Iu, Iv, and Iw (a pattern of a waveform of driving voltage Vu, Vv, and Vw of a coil of each phase in FIG. 5). At this time, since a one-cycle waveform of the driving voltage Vu, Vv, and Vw representing positions 1 to 6 of the rotor is repeated, the rotor has six positions patterns (see FIG. 6 for detailed positions).

At this time, when the rotor is rotated, magnetic flux emitted from a magnet provided on an inner wall of the rotor generates back electromotive force (induced voltage) and the position of the rotor may be detected by using the back electromotive force. Specifically, the back electromotive force has a waveform (see FIG. 7 for a detailed waveform; a distorted sine wave form) similar to a sine wave at the same phase as the waveform of the driving voltage.

Meanwhile, FIG. 6 is a diagram showing 6 positions of the rotor depending on polarity switching of the stator. For example, when the rotor is located at position 1, a U-phase driving terminal is electrically disconnected from a power supply terminal Vcc through an output transistor Tru1 which is turned on and a V-phase driving terminal is electrically disconnected from GND through Trv2, causing motor current to flow from the U-phase driving terminal to the V-phase driving terminal. At this time, since a stator polarity of the driving terminal which is electrically disconnected from Vcc has an S pole and a stator polarity of the driving terminal which is electrically disconnected from GND has an N pole, the rotor rotates in a clockwise direction. Herein, back electromotive force Vwc is generated on a W-phase wire which is not electrically disconnected from Vcc and GND and thus is exteriorly separated from a driving circuit, that is, is in a potential floating state and the position of the rotor is detected by using the generated back electromotive force. Specifically, when the rotor is located at position 1, a W phase of the stator is positioned in the middle of the S pole and the N pole of the rotor and its polarity is changed depending on movement of the rotor. That is, the position of the rotor can be detected by detecting a timing (zero-cross point) when the polarity of Vwc is changed. Specifically, since a phase delay of 30 degrees is generated from the zero-cross point of the W phase of the stator to a driving timing of the next position 2 of the rotor, the rotation position of the rotor can be detected and controlled by switching the motor driving circuit at a timing when a phase of 30 degrees is delayed from the zero-cross point. Since the detection/control principle of the rotation position of the rotor can be applied to even positions 2 to 6 of the rotor, a principle to detect the rotation position of the rotor at positions 2 to 6 of the rotor will not be described.

Figure 7:
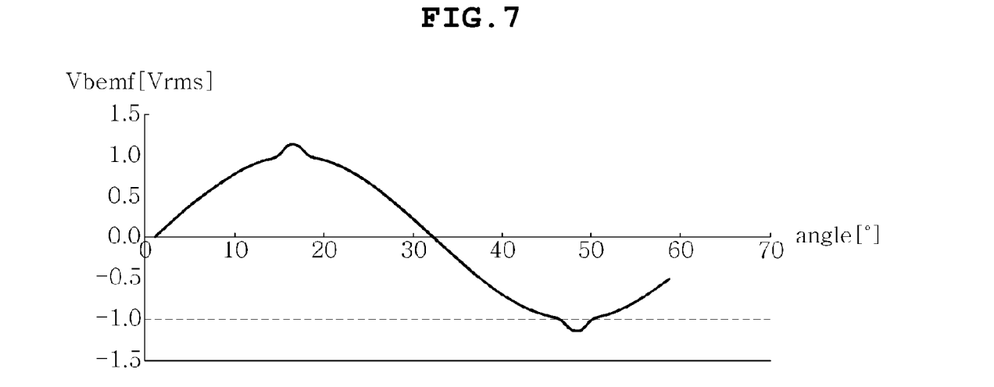
FIG. 7 is a graph showing a waveform of back electromotive force generated in a sensorless-type brushless DC motor according to a preferred embodiment of the present invention.
Figure 8:
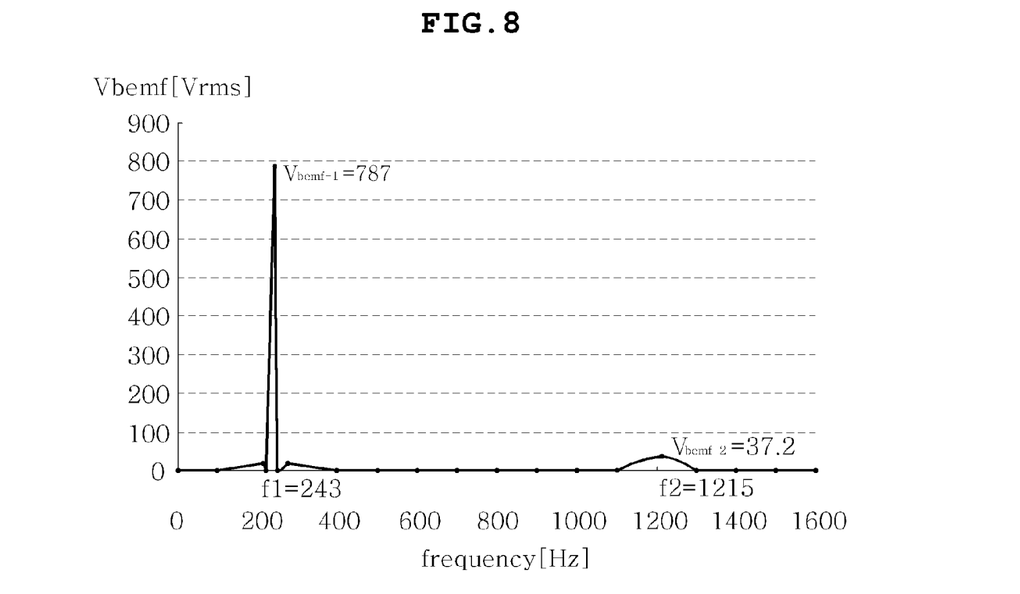
FIG. 8 is a graph showing a result of FET-analyzing a waveform of back electromotive force shown in FIG. 7.

FIG. 7 is a graph showing a waveform of back electromotive force generated in a sensorless-type brushless DC motor according to a preferred embodiment of the present invention and FIG. 8 is a graph showing a result of FET-analyzing a waveform of back electromotive force shown in FIG. 7. Hereinafter, referring to the figures, a sensorless-type brushless DC motor 10 according to the embodiment will be described. Meanwhile, the structure of the sensorless-type brushless DC motor 10 will be described in description of FIG. 9.

As shown in FIGS. 7 and 8, the sensorless-type brushless DC motor 10 according to the embodiment includes a magnet 30 provided in the rotor and a stator 32 facing the magnet 30 and formed by winding a coil 32b on a core 32a stacked with sheets. The position of the rotor is detected by detecting back electromotive force Vbemf induced to the coil 32b and the back electromotive force Vbemf includes a harmonic component 5 times higher than a fundamental wave, and an amplitude ratio of a 5-times harmonic wave to the fundamental wave is set to 1% or more.

For example, the back electromotive force Vbemf has a waveform including the 5-times harmonic wave having approximately 1215 Hz which is a harmonic frequency f2 5 times higher than the fundamental wave having a fundamental frequency f1 of approximately 243 Hz. At this time, an amplitude $V_{bemf-2}$ at the 5-times harmonic wave is 37.2 Vrms. Therefore, an amplitude ratio between the amplitude and 787 Vrms which is an amplitude $V_{bemf-1}$ at the fundamental wave is set to 1% or more (see FIG. 8).

The waveform of the back electromotive force Vbemf set as above has a distorted bell-shaped sine wave form (see FIG. 7). That is, the waveform of the back electromotive force Vbemf has a shape having a peak value larger than the back electromotive force waveform in the prior art (see FIG. 1) having the general sine wave form, that is, a bell-shaped sine wave (bell-shaped wave). When the back electromotive force has such a waveform, a curvature point is generated at the peak value. As a result, it is possible to prevent the failure in detecting the position of the rotor by ensuring the peak-to-peak amplitude ratio of the back electromotive force without influencing the position detection at the zero-cross point. That is, the rapid change characteristic of the driving current is larger than the general sine wave structure by solving the decrease of the back electromotive force, thereby preventing the failure in detecting the position of the rotor in the an inductive sensor mode of a stop state.

Figure 9:
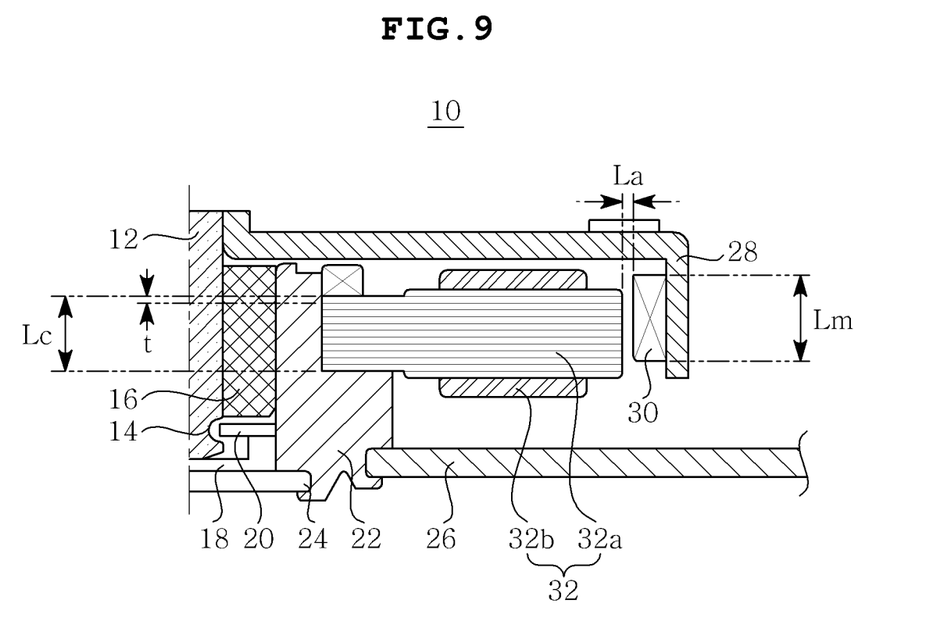
FIG. 9 is a cut cross-sectional view of a sensorless-type brushless DC motor according to a preferred embodiment of the present invention.

FIG. 9 is a cut cross-sectional view of a sensorless-type brushless DC motor according to a preferred embodiment of the present invention. Hereinafter, referring to the figure, the structure of the sensorless-type brushless DC motor 10 according to the embodiment will be schematically described.

As shown in FIG. 9, the sensorless-type brushless DC motor 10 according to the embodiment includes a shaft 12, a support member stator 32 and a rotor case 28 coupled with the magnet 30.

The shaft 12 has a cylindrical shape having a predetermined diameter and is rotated by electromotive force generated by interaction of the magnetic 30 and the stator 32, and in addition, rotates integrally with the rotor case 28 in the upper part of the motor 10.

The support member serves to support all components constituting the brushless DC motor 10 including the shaft 12 and includes a bearing part rotatably supporting the shaft 12 and a support part for supporting the bearing part.

The bearing part includes a bearing 16 supporting the shaft 12 in a radial direction and a thrust washer 18 supporting the shaft 12 in an axial direction. Herein, the bearing 16 has a hollow cylindrical shape having a hollow portion receiving the shaft 12 therein and rotatably supports the shaft 12 by a fluid interposed between the bearing 16 and the shaft 12. Further, the thrust washer 18 is disposed in the lower part of the shaft 12 and rotatably supports the lower end of the shaft 12. At this time, a stopper 20 that is interposed in a concave groove 14 of the shaft 12 to prevent the rotor from being levitated while rotating is provided on an upper part of the side of the thrust washer 18.

The support part includes a bearing holder 22 supporting the bearing 16, a support 24 supporting the thrust washer 18, and a base plate 26 supporting all components constituting the brushless DC motor 10 including the bearing holder 22.

The bearing holder 22 has the hollow cylindrical shape. The inner circumference of the bearing holder 22 supports the outer circumference of the bearing 16 and the outer circumference of the bearing holder 22 is stepped to have a seat surface on which the stator 32 is seated. At this time, the bearing holder 22 is coupled and supported to the base plate 26 while being subjected to cauking or spinning.

The support 24 is disposed in the lower part of the thrust washer 18 to support the thrust washer 18 and is coupled and supported to the inside of the bearing holder 22 being subjected to cauking or spinning.

The base plate 26 supports all the components of the brushless DC motor 10. The brushless DC motor 10 is fixed to devices such as a hard disk drive, etc., in the base plate 26. The outer part of the bearing holder 22 is coupled and supported to the base plate 26 being subjected to cauking or spinning.

The stator 32 is applied with external power to use in forming an electrical field and has a structure in which the coil 32b is wound on the core 32 stacked with the sheets. When current is supplied to the coil 32b, magnetic flux of the armature is excited by the supplied current. When the magnetic flux of the armature 30 is interlinked with magnetic flux generated by the magnet 30, torque is generated and as a result, the rotor case 28 is rotated.

The rotor case 28 rotates with the shaft 12 while the center of the rotor case 28 is inserted into the shaft 12. The magnet 30 generating electromotive force by interaction with the stator 32 is coupled to the inner circumference of the rotor case 28. At this time, the magnet 30 serves to generate force for rotating the rotor case 28 by interaction with the stator 32 and has an annular ring-shaped structure in which magnetic poles are alternately magnetized in a circumferential direction.

Herein, in order to prevent the back electromotive force Vbemf from being decreased, a ratio Lc/Lm of a longitudinal length Lc of the core 32a to a longitudinal length Lm of the magnet 30 is preferably 0.85 or less and a ratio t/La of the thickness t of each sheet of the core 32a to an aperture La between the core 32a and the magnet 30 is preferably in the range of 0.55 to 0.85. The value as an experimental value representing a structural characteristic for minimizing the decrease of the back electromotive force Vbemf while the back electromotive force configures the distorted sine wave may be called a value having a critical meaning acquired through several tests. When the waveform of the back electromotive force Vbemf is the distorted sine wave, and Lc, Lm, La, and t have the above-mentioned values, it is possible to prevent the back electromotive force from being changed due to an influence of an external environment such as temperature while minimizing the back electromotive force, thereby preventing a starting failure such as the failure in detecting the initial position in a stable starting characteristic, in particular, the stop state.

According to an embodiment of the present invention, it is possible to prevent a failure in detecting an initial position of a rotor by controlling a waveform of back electromotive force and minimize an increase of a starting time. Specifically, the waveform of the back electromotive force has a bell-shaped wave form to have a peak value larger than a general sine wave form, thereby minimizing a decrease of the back electromotive force. As a result, it is possible to prevent the failure in detecting the initial position of the rotor in an inductive sensor mode of a stop state by markedly increasing a rapid change characteristic of driving current to detect the initial position of the rotor which stops.

Although the preferred embodiments of the present invention have been disclosed for illustrative purposes, they are for specifically explaining the present invention and thus a sensorless-type brushless DC motor according to the present invention are not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A sensorless-type brushless DC motor, comprising:
a magnet provided in a rotor; and
a stator formed by winding a coil on a core stacked with sheets while facing the magnet,
wherein the position of the rotor is detected by detecting back electromotive force having a waveform that includes a fundamental frequency wave and a $5^{th}$ harmonic of the fundamental frequency wave but substantially not including $3^{rd}$ harmonic and 7th harmonic waves of the fundamental frequency wave as compared to the $5^{th}$ harmonic of the fundamental frequency wave, and an amplitude ratio of the 5th harmonic of the fundamental frequency wave to the fundamental frequency wave is set to be 1% or more.

2. The sensorless-type brushless DC motor as set forth in claim 1, wherein a waveform of the back electromotive force is a distorted sine wave form.

3. The sensorless-type brushless DC motor as set forth in claim 1, wherein the waveform of the back electromotive force has a peak value larger than a sine wave.

4. The sensorless-type brushless DC motor as set forth in claim 1, wherein a ratio Lc/Lm of a longitudinal length Lc of a core to a longitudinal length Lm of the magnet is 0.85 or less.

5. The sensorless-type brushless DC motor as set forth in claim 1, wherein a ratio t/La of the thickness t of each sheet of the core to an aperture La between the core and the magnet is in the range of 0.55 to 0.85.

* * * * *